United States Patent
Pope

(10) Patent No.: US 6,260,476 B1
(45) Date of Patent: Jul. 17, 2001

(54) BEVERAGE BREWING SUBSTANCE HOLDER

(75) Inventor: Randy D. Pope, Edinburg, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 09/369,542

(22) Filed: Aug. 6, 1999

(51) Int. Cl.[7] ........................................... A47J 31/00
(52) U.S. Cl. ........................ 99/323; 99/295; 99/306; 210/474
(58) Field of Search ............................. 99/323, 295, 322, 99/304, 307, 306; 210/474, 477

(56) References Cited

U.S. PATENT DOCUMENTS

| | | |
|---|---|---|
| D. 423,284 | 4/2000 | Fischer ................................ D7/400 |
| 3,034,418 | 5/1962 | Bunn . |
| 3,371,593 | 3/1968 | Price . |
| 3,374,897 | 3/1968 | Martin ................................ 99/295 |
| 3,450,024 | 6/1969 | Martin . |
| 3,593,650 | 7/1971 | Martin et al. ........................ 99/295 |
| 3,610,132 | 10/1971 | Martin et al. ........................ 99/295 |
| 3,793,935 | 2/1974 | Martin ................................ 99/295 |
| 3,861,285 | 1/1975 | Martin ................................ 99/295 |
| 4,280,401 | 7/1981 | Cleland ............................... 99/295 |
| 4,303,525 | 12/1981 | Stover ................................ 210/455 |
| 4,739,697 | * 4/1988 | Roberts .............................. 99/295 |
| 4,765,896 | 8/1988 | Hartley et al. ...................... 210/474 |
| 5,064,533 | 11/1991 | Anson ................................ 210/232 |
| 5,287,797 | * 2/1994 | Grykiewicz et al. ............. 99/304 X |

* cited by examiner

Primary Examiner—Reginald L. Alexander
(74) Attorney, Agent, or Firm—Barnes & Thornburg

(57) ABSTRACT

A beverage brewing substance holder for holding a beverage brewing substance, such as coffee, provided in a pouch or in a loose filter for use in brewing beverage can be attached to a beverage brewer. The holder includes an open-ended, cup-shaped body having a drain hole provided therethrough. A supporting structure is mounted within the body and the pouch or loose filter sits thereupon such that a gap is formed between the pouch or the loose filter and the drain hole. This prevents the formation of a vacuum between the pouch or loose filter and the body. A handle can be attached to one of two positions on the body. First and second pairs of opposed, elongated, horizontal flanges are formed on the body and slide along respective rails on the brewer to accommodate two different brewers.

10 Claims, 3 Drawing Sheets

ABBEVERAGE BREWING SUBSTANCE HOLDER

BACKGROUND OF THE INVENTION

This invention is generally directed to a novel beverage brewing substance holder which can be used with two different beverage brewers, which is specifically designed to be used with a pouch containing a beverage brewing substance, such as ground coffee, and which promotes flow of brewed beverage therethrough.

Beverage brewers used today have rails on which a beverage brewing substance holder, which is used to hold the ground coffee therein, is supported. One type of beverage brewer has rails which are laterally displaced from each a predetermined distance. Another type of beverage brewer has rails which are spaced further laterally apart from each other than the first-mentioned beverage brewer. Instead of using two separate beverage brewing substance holders, the present invention provides a novel beverage brewing substance holder which can be used with both beverage brewers.

In addition, holders that are designed to accommodate a pouch containing a ground beverage brewing substance, such as ground coffee, therein can have a problem with the pouch being drawn into the drain hole in the holder. The present invention provides a novel supporting member which prevents the formation of a vacuum between the pouch and the drain hole so that flow of brewed beverage is promoted from the holder.

Other features and advantages to the present invention will become apparent upon a reading of the attached specification in combination with a study of the drawings.

OBJECTS AND SUMMARY OF THE INVENTION

An object of the present invention is to provide a novel beverage brewing substance holder which can be used with the two different beverage brewers.

Another object of the present invention is to provide a supporting member within the holder upon which a pouch containing a beverage brewing substance, such as ground coffee, or a loose filter containing a beverage brewing substance, such as ground coffee, sits, such that a gap is provided between the pouch or the loose filter and the drain hole to prevent formation of a vacuum within the drain hole.

A further object of the present invention is to provide a supporting member within the holder which provides a path between the supporting member and the holder to promote a flow of a stream of liquid therebetween.

Briefly, and in accordance with the foregoing, the present invention discloses a beverage brewing substance holder for holding a beverage brewing substance, such as ground coffee, provided in a pouch or in a loose filter for use in brewing a beverage. The holder can be attached to beverage brewers which have differently spaced rails. The holder includes an open-ended, cup-like body having a drain hole provided therethrough. A supporting structure is mounted within the body and the pouch or loose filter sits thereupon such that a gap is formed between the pouch or the loose filter and the drain hole. This prevents the formation of a vacuum between the pouch or loose filter and the body. A handle can be attached to one of two positions on the body. First and second pairs of opposed, elongated, horizontal flanges are formed on the body and slide along respective rails on the beverage brewer to accommodate the two different beverage brewers.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
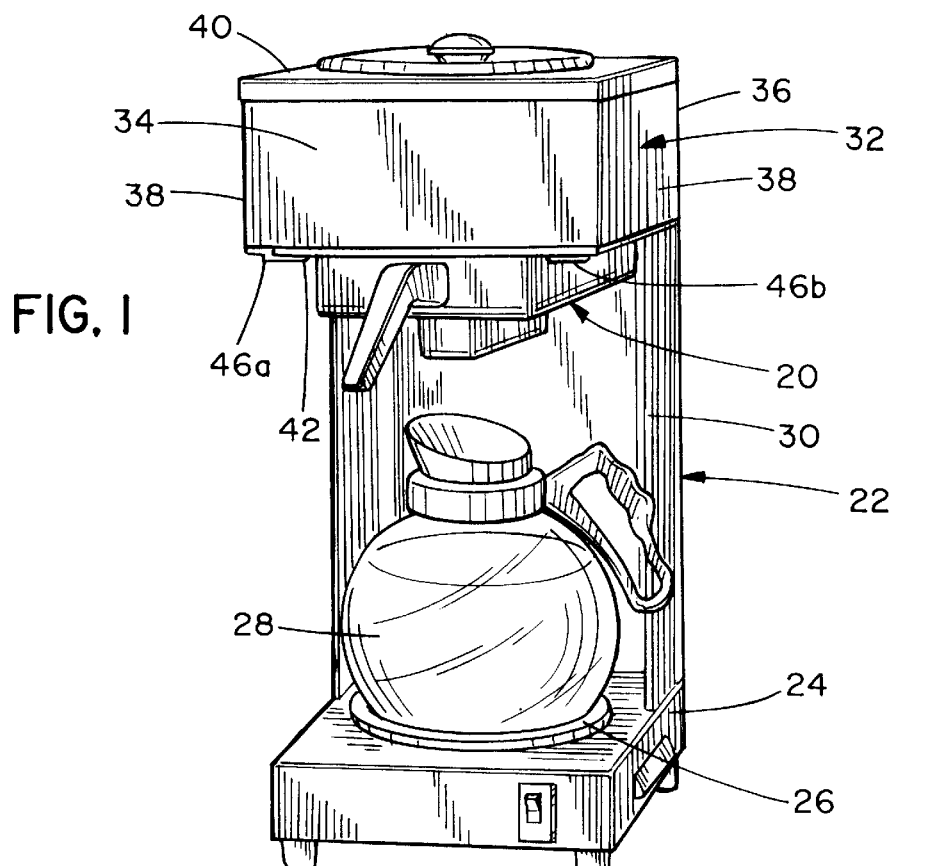
FIG. 1 is a perspective view of a beverage brewer and a beverage brewing substance holder, the beverage brewing substance holder incorporating the features of the invention.
Figure 2:
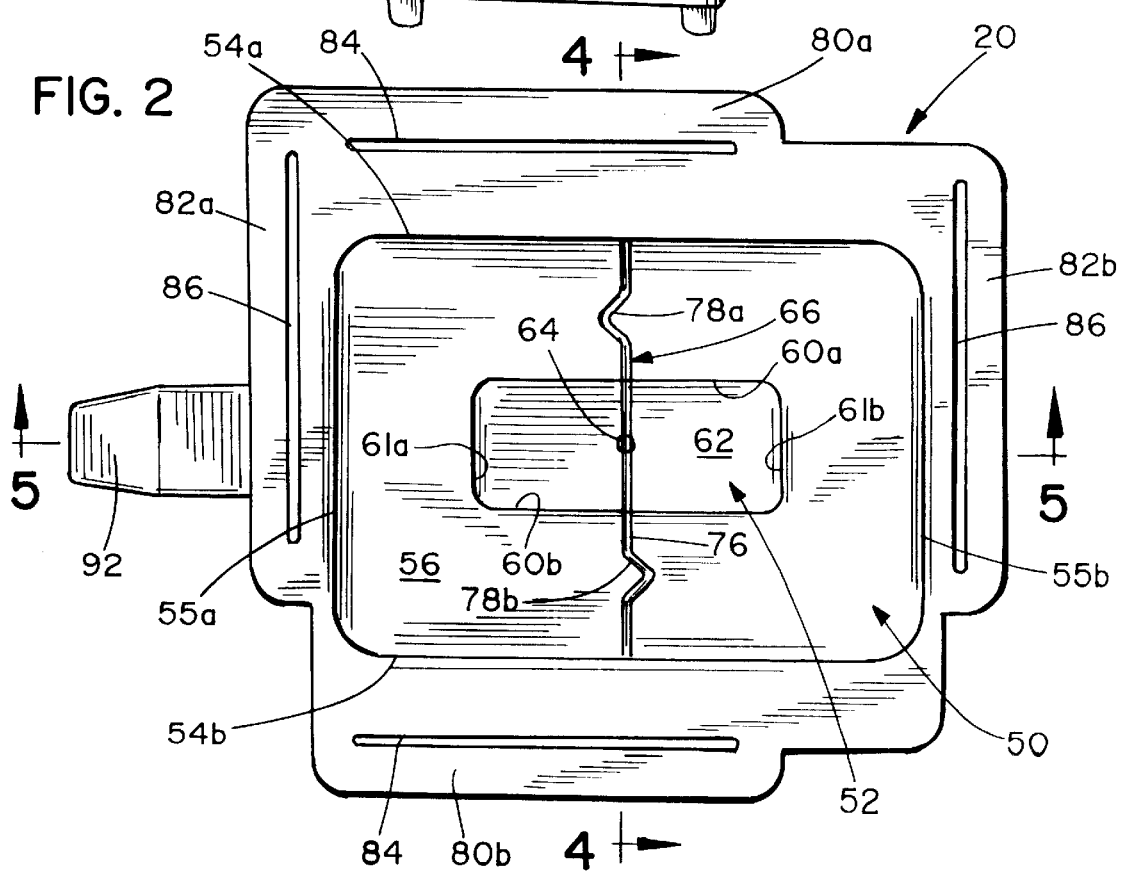
FIG. 2 is a top plan view of the holder of FIG. 1.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a novel beverage brewing substance holder 20 which can be used with the two different beverage brewers, one of which is shown in FIG. 1, to brew a beverage brewing substance, such as coffee. The beverage brewer 22 shown in FIG. 1 is conventional and has a flat horizontal base 24 with a base 26 thereon upon which a decanter 28 can be set to receive brewed beverage from the brewer 22. The base 26 can be provided with electric heating elements to maintain the brewed beverage in the decanter 28 warm when it is seated thereupon. A vertical body 30 extends upwardly from the rear of the base 24 and a forwardly projecting upper portion 32 extends from the top end of the body 30 and projects forwardly over the base 24 and the base 26.

The upper portion 32 includes a front wall 34, a rear wall 36, opposite side walls 38, a top wall 40 and a horizontal bottom wall 42 which are joined to form a box-like member. A reservoir can be provided therein to hold a quantity of water which is heated by heating means within the upper portion 32. The bottom wall 42 has a spray head 44 mounted thereon which is in communication with the reservoir. Openings in the spray head 44 direct water from the reservoir downwardly toward the base 26.

Figure 3:
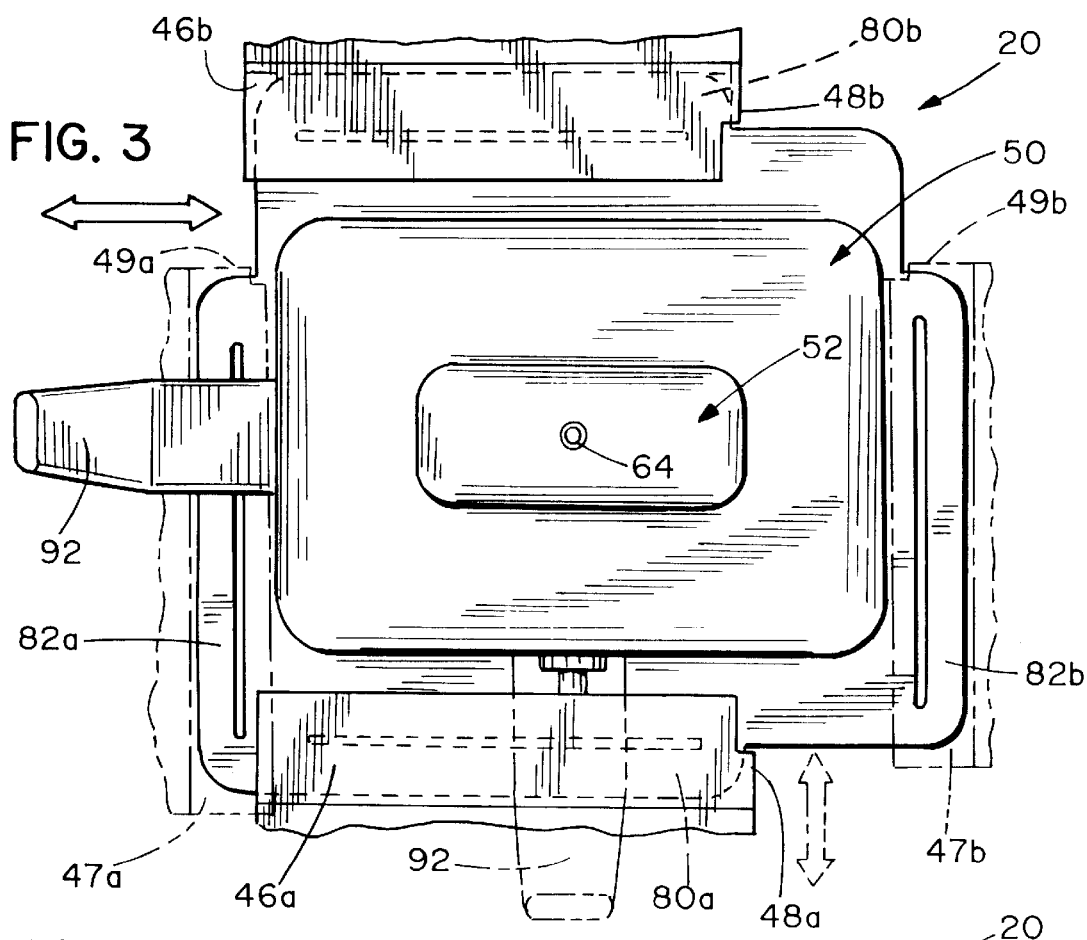
FIG. 3 is a bottom plan view of the holder of FIG. 1, showing a first position of a handle in full line and showing a second position of a handle in phantom line, and a partial view of two sets of rails of two different beverage brewers, one set of rails being shown in full line and the other set of rails being shown in phantom line.
Figure 4:
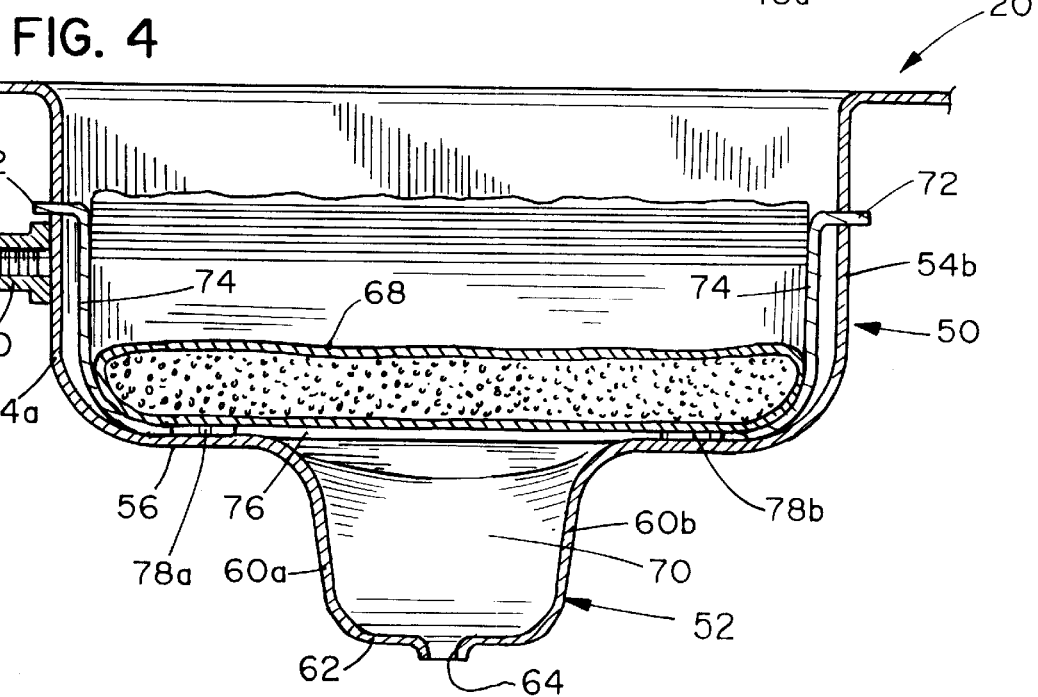
FIG. 4 is a cross-sectional view of the holder taken along line 4—4 in FIG. 2.
Figure 5:
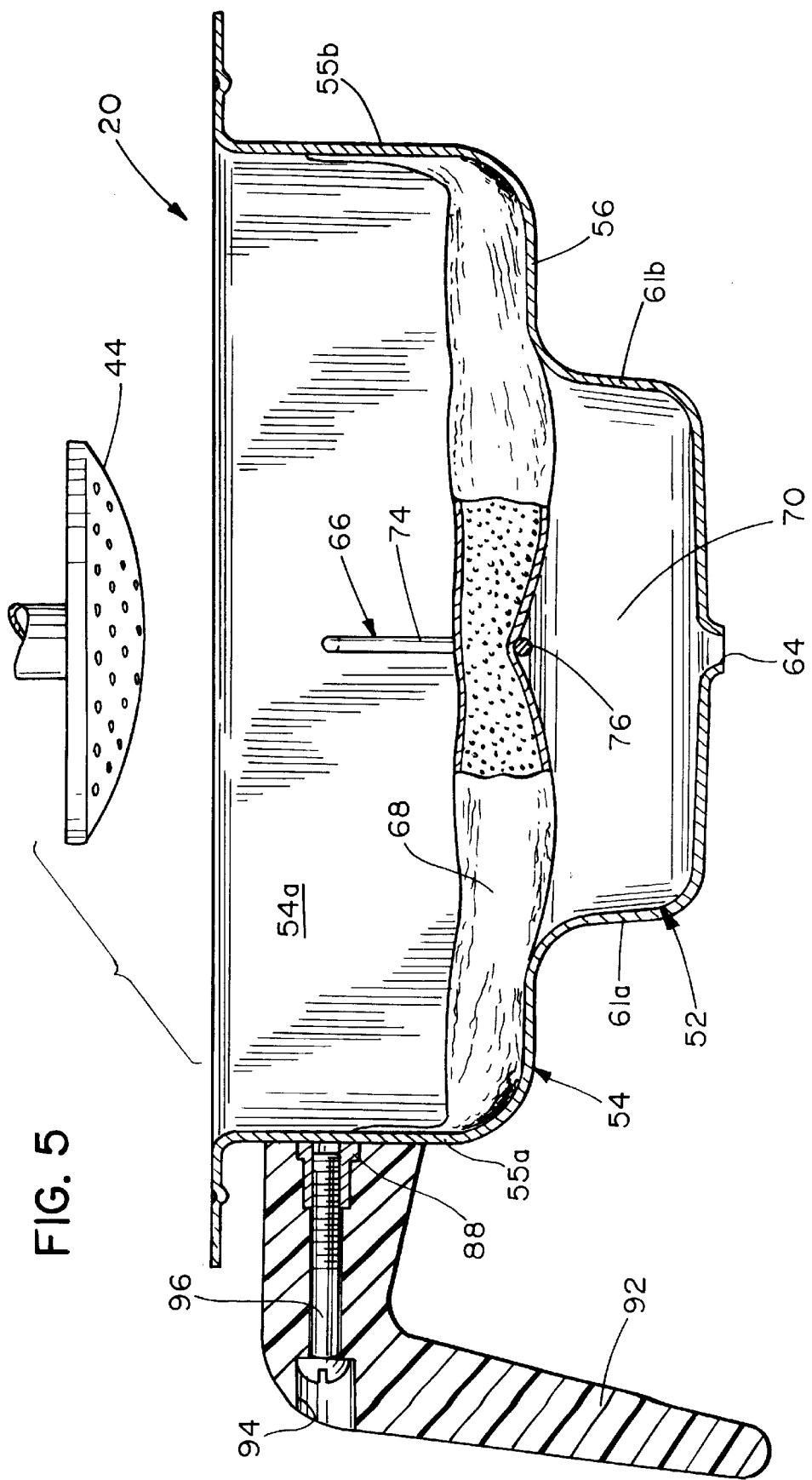
FIG. 5 is a cross-sectional view of the holder taken along line 5—5 in FIG. 2, and showing a spray head of the beverage brewer positioned thereabove.

The bottom wall 42 has a pair of elongated, spaced apart, parallel, horizontal rails 46a, 46b mounted thereon. The rails 46a, 46b extend from proximate the front wall 34 of the upper portion 32 toward the body 30. The rails 46a, 46b are on opposite sides of the spray head 44 and do not interfere therewith. Each rail 46a, 46b has a rear wall or stop member 48a, 48b at the rear end thereof, see FIG. 3, which extends perpendicularly to the remainder of the rails 46a, 46b.

The holder 20 can be mounted on the rails 46a, 46b and holds a beverage brewing substance, such as coffee, in a pouch 68 or in a loose filter (not shown) therein. The holder 20 is formed from a body which has a cup-like, open-ended upper portion 50 and a cup-like, open-ended sump or lower portion 52 attached to the upper portion 50. The lower portion 52 is centered on the upper portion 50. The upper and lower portions 50, 52 are made of a suitable material that can withstand higher heat levels, is dishwasher safe and is food safe, such as stainless steel. The upper portion 50 may be rectangular such that a first pair of opposed side walls 54a, 54b and a second pair of opposed side walls 55a, 55b are provided, with each first wall 54a, 54b being longer in length than each second wall 55a, 55b.

A bottom wall 56 is integrally formed with the side walls 54a, 54b, 55a, 55b and has a rectangular aperture through the center thereof. Likewise, the lower portion 52 may be rectangular such that a first pair of opposed side walls 60a, 60b and a second pair of opposed side walls 61a, 61b are provided, with each first wall 60a, 60b being longer in length than each second wall 61a, 61b. A bottom wall 62 is integrally formed with the side walls 60a, 60b, 61a, 61b. The lower portion 52 is attached to the upper portion 50 in the aperture. The side walls 60a, 60b, 61a, 61b of the lower portion 52 may be integrally formed with the bottom wall 56 of the upper portion 50 so that the holder 20 can be formed by stamping, or the upper and lower portions 50, 52 may be formed as separate pieces and suitably joined together, such as by welding. The upper portion 50 has a greater length and width than the length and width of the lower portion 52.

A drain hole 64 is provided through the center of the bottom wall 62 of the lower portion 52. The drain hole 64 can be formed by a suitable punching operation.

A thin, elongated supporting member 66 for a pouch 68 filled with ground beverage brewing substance, such as coffee, or a loose filter filled with ground beverage brewing substance, such as coffee, is provided within the holder 20. As shown in the drawings and as described herein, a pouch 68 is provided. It is to be understood, however, that the present invention can be used with a loose filter.

The pouch 68 sits on the supporting member 66 when seated within the holder 20 such that a gap 70 is provided between the pouch 68 and the drain hole 64. This gap 70 prevents a formation of a vacuum within the drain hole 64 which could occur if the pouch 68 is drawn into the drain hole 64 and which would result in erratic flow from the drain hole 64. In addition, the supporting member 66 provides a path for air between the pouch 68 and the bottom wall 62 of the lower portion 52 to keep a continuous stream of liquid flowing through the holder 20.

As shown in the drawings, the supporting member 66 is a small diameter wire or a similar member. The wire 66 has opposite ends 72 which are suitably mounted to the side walls 54a, 54b of the upper portion 50, a pair of first sections 74 which extend downwardly along the side walls 54a, 54b of the upper section 50, and a second section 76 which extends across the bottom wall 56 of the upper section 50 and across the aperture in the bottom 56 of the upper section 50 such that it spans the lower section 52. The second section 76 of the wire 66 is positioned such that it sits against the bottom wall 56 of the upper portion 50 and extends directly across and over the drain hole 64. The second section 76 includes a pair of generally U-shaped portions 78a, 78b along the length thereof. The generally U-shaped portions 78a, 78b are opposite to each other such generally U-shaped portion 78a extends toward side wall 55a and generally U-shaped portion 78b extends towards side wall 55b. The ends 72 of the wire 66 are suitably mounted to the side walls 54a, 54b of the upper portion 50, such as by flaring, so that the wire 66 is rotatable within the holder 20. The U-shaped portions 78a, 78b provide for a friction fit with the bottom wall 56 of the upper portion 50 to deter the wire 66 from rotating out of position once it is properly placed in position by a user.

A first pair of opposed, elongated, horizontal flanges 80a, 80b are attached to the upper end of the upper portion 50. Each flange 80a, 80b extends outwardly from the respective sides 54a, 54b of the upper portion 50 and may be integrally formed with the upper portion 50 or may be formed as separate members and suitably attached to the upper portion 50, such as by welding. Each flange 80a, 80b starts at one end of the respective side wall 54a, 54b and extends therealong. Each flange 80a, 80b does not extend along the entire length of the respective side wall 54a, 54b such that each flange 80a, 80b terminates a predetermined distance away from the opposite end of the respective side wall 54a, 54b. A strengthening rib 84 is provided on each flange 80a, 80b and extends along substantially the entire length thereof. Each strengthening rib 84 may be formed by stamping or by securing a separate member on the respective flange 80a, 80b.

A second pair of opposed, elongated, horizontal flanges 82a, 82b are attached to the upper end of the upper portion 50. Each flange 82a, 82b extends outwardly from the respective sides walls 55a, 55b of the upper portion 50 and may be integrally formed with the upper portion 50 or may be formed as separate members and suitably attached to the upper portion 50, such as by welding. Flange 82a starts at a predetermined distance outwardly from one end of side wall 55a such that it merges with flange 80a, and extends along side wall 55a. Flange 82b starts at one end of the side wall 55b and extends therealong. Each flange 82a, 82b does not extend along the entire length of the respective side wall 55a, 55b such that each terminates a predetermined distance away from the opposite end of the side wall 55a, 55b. A strengthening rib 86 is provided on each flange 82a, 82b and extends along substantially the entire length thereof. Each strengthening rib 86 may be formed by stamping or by securing a separate member on the respective flange 82a, 82b.

A first attachment structure 88 is provided on side wall 55a of the upper portion 50 and a second attachment structure 90 is provided on side wall 54a of upper portion 50. A handle 92 may be attached to either attachment structure 88, 90 so that a user can handle the holder 20. Each attachment structure 88, 90 may take the form of a protuberance, such as a weld nut, having a threaded blind bore therein. Each attachment structure 88, 90 is suitably secured to the upper portion 50 of the holder 20, such as by welding.

The handle 92 includes a passageway 94 therethrough having a countersunk bore at each end thereof. One countersunk bore seats over the attachment structure, such as attachment structure 88 as shown in the drawings, when the handle 92 is mounted thereon. A conventional screw 96 is inserted through the passageway 92 and screwed into the threaded bore in the attachment structure 88. The head of the screw 94 sits in the other countersunk bore. The handle 92 can be attached to either attachment structure 88 or 90.

In operation, the handle 92 is attached to one of the attachment structures, such as attachment structure 88 as shown in the drawings, by inserting the screw 96 through the handle passageway 94 and screwing the screw 96 into the blind bore in the attachment structure 88. Whether the handle 92 is attached to attachment structure 88 or to attachment structure 90 is attached is dependent on which brewer the holder 20 is going to be mounted. Flanges 80a, 80b, which are closer together than flanges 82a, 82b, enable the mounting of the holder 20 on the rails 46a, 46b of the smaller brewer. For this use, the handle 92 is attached to attachment structure 88. Flanges 82a, 82b, which are farther apart than flanges 80a, 80b, enable the mounting of the holder 20 on the rails 47a, 47b of the larger brewer. For this use, the handle 92 is attached to attachment structure 90.

When a batch of beverage is to be brewed, the pouch 68 containing ground beverage brewing substance, such as coffee, is inserted into the holder 20. The pouch 68 sits upon and covers the bottom wall 56 of the upper portion 50 and may sag into the sump or lower portion 52 of the holder 20. The center of the pouch 68 sits on the second section 76, including portions 78a, 78b, of the supporting structure 66 such that the pouch 68 is separated from the drain hole 64 and the gap 70 is formed.

The holder 20 is slidably engaged with the rails, such as rails 46a, 46b as shown in the drawings, and is supported beneath the upper portion 50 of the brewer 22 to receive hot water discharged by the spray head 44.

The holder 20 is positioned under the spray head 44 such that the spray head 44 is directly over the drain hole 64. The holder 20 is slid along the rails 46a, 46b until the end of the flanges 80a, 80b contact the respective rear stops 48a, 48b on the rails 46a, 46b. If the handle 92 is attached to attachment structure 90, flanges 82a, 82b are slid along the rails 47a, 47b until the end of the flanges 82a, 82b contact the respective rear stops 49a, 49b.

A decanter 28 is arranged on the base 26 to receive freshly brewed beverage flowing from the holder 20. When the holder 20 and the decanter 28 are thusly arranged, the supply of hot water flows from the spray head 44 into the holder 20. Water percolates down through the pouch 68, extracting flavor and essence therefrom. The supporting structure 66 ensures that the pouch 68 does not form a vacuum with the drain hole 64. Brewed beverage flows along the path formed between the pouch 68 and the supporting structure 66. The beverage brewed within the holder 20 flows out through the drain hole 64 and into the decanter 28.

When the brewing cycle is completed, the user can remove the holder 20 from the rails, such as rails 46a, 46b as shown in the drawings, by sliding the holder 20 outwardly from the beverage brewer 22. The pouch 68 can be dumped out of the holder 20 so that a new pouch can be inserted therein and the holder 20 remounted to the beverage brewer 22. Also, when the pouch 68 is removed from the holder 20, the holder 20 can be cleaned. The wire 66 can be rotated to clean thereunder by overcoming the friction fit with sufficient force. The wire 66 is repositioned as shown in the drawings and the friction fit between the portions 78a, 78b is reinstated prior to insertion of another pouch in the holder 20.

While a preferred embodiment of the present invention is shown and described, it is envisioned that those skilled in the art may devise various modifications of the present invention without departing from the spirit and scope of the appended claims.

The invention claimed is:

1. A beverage brewing substance holder for holding a beverage brewing substance provided in a pouch or in a loose filter, said holder comprising: a body comprising an upper portion having a predetermined dimension, and a lower portion attached to said upper portion, said lower portion having a predetermined dimension which is smaller than said predetermined dimension of said upper portion, and a drain hole provided through a bottom wall of said lower portion; and a wire mounted within said body and spaced from said bottom wall, wherein the pouch or loose filter sits on said wire when the pouch or the loose filter is seated within said body to provide a gap between the pouch or the loose filter and said drain hole; said upper portion having a bottom wall and said wire extending across and seating against said bottom wall of said upper portion.

2. A beverage brewing substance holder as defined in claim 1, wherein said wire includes at least one generally U-shaped portion which seats against said bottom wall of said upper portion.

3. A beverage brewing substance holder for holding a beverage brewing substance provided in a pouch or in a loose filter, said beverage substance holder comprising: a body including a cup-shaped, open-ended upper portion having a predetermined dimension, and a cup-shaped, open-ended lower portion attached to said upper portion, said lower portion having a predetermined dimension which is smaller than said predetermined dimension of said upper portion, a drain hole provided through a wall of said lower portion; a small diameter supporting member having a portion thereof affixed to said body such that said supporting member is movably captive on said body and having a portion which is spaced from said bottom wall such that a gap is provided between said spaced portion and said drain hole, the pouch or loose filter sits on said supporting member when the pouch or the loose filter is seated within said body to provide a gap between the pouch or the loose filter and said drain hole, a first pair of opposed, elongated, horizontal flanges attached to said upper portion and a second pair of opposed, elongated, horizontal flanges attached to said upper portion, wherein said upper portion is rectangular in cross-section and has opposed first sides having a first predetermined length and opposed second sides having a second predetermined length, said first pair of flanges are respectively attached to said opposed first sides, and said second pair of flanges are respectively attached to said opposed second sides.

4. A beverage brewing substance holder as defined in claim wherein each said first flange extends from one end of said first side to a point which is spaced from a second end of said first side, and each said second flange extends from one end of said second side to a point which is spaced from a second end of said second side.

5. A beverage brewing substance holder for holding a beverage brewing substance provided in a pouch or in a loose filter, said holder being capable of being attached to an associated brewing machine, said holder comprising:

a cup-shaped, open-ended body comprising a bottom wall and at least one side wall extending upwardly therefrom, said body having opposed first sides of a first predetermined length and opposed second sides of a second predetermined length which is shorter than said first predetermined length; a drain hole provided through said bottom wall; a first pair of opposed, elongated, horizontal flanges respectively attached to said opposed first sides, each said flange of said first pair being shorter in length than said length of said respective first side, said flanges of said first pair providing first surfaces against which respective rails of the associated brewing machine are capable of bearing against to properly position said body on the machine in a first orientation; and a second pair of opposed, elongated, horizontal flanges respectively attached to said opposed second sides, each said flange of said second pair being shorter in length than said length of said respective second side, said flanges of said second pair providing second surfaces against which the respective rails of the associated brewing machine are capable of being against to properly position said body on the machine in a second orientation; a handle; and a first attachment structure provided on one of said first sides for attaching said handle to said one first side and a second attachment structure provided on one of said second sides for attaching said handle to said one second side.

6. A beverage brewing substance holder as defined in claim 5, wherein said body comprises a cup-shaped, open-ended upper portion having a predetermined dimension, and a cup-shaped, open-ended lower portion attached to said upper portion, said lower portion having a predetermined dimension which is smaller than said predetermined dimension of said upper portion, said first pair of flanges and said second pair of flanges being attached to said upper portion.

7. A beverage brewing substance holder as defined in claim 6, wherein said flanges are attached to a top end of said upper portion.

8. A beverage brewing substance holder as defined in claim 5, wherein each said attachment structure comprises a threaded socket which accepts a screw therein.

9. A beverage brewing substance holder for holding a beverage brewing substance provided in a pouch or in a loose filter, said holder comprising: a body having a bottom wall and a drain hole provided there through; and a small diameter supporting member formed of wire having a portion thereof affixed to said body such that said supporting member is movably captive on said body and having a portion which is spaced from said bottom wall such that a gap is provided between said spaced portion and said drain hole, said supporting member providing a support upon which the pouch or loose filter sits when the pouch or the loose filter is seated within the body to provide a gap between the pouch or the lose filter and the drain hole; a first pair of opposed, elongated horizontal flanges attached to said body and a second pair of opposed, elongated, horizontal flanges attached to said body, wherein said body is rectangular in cross-section and has opposed first sides having a first predetermined length and opposed second sides having a second predetermined length which is shorter than said first predetermined length, said first pair of flanges are respectively attached to said opposed first sides, and said second pair of flanges are respectively attached to said opposed second sides.

10. A beverage brewing substance holder as defined in claim 9, wherein each said first flange extends from one end of said first side to a point which is spaced from a second end of said first side, and each said second flange extends from one end of said second side to a point which is spaced from a second end of said second side.

* * * * *

UNITED STATES PATENT AND TRADEMARK OFFICE
CERTIFICATE OF CORRECTION

PATENT NO. : 6,260,476 B1
DATED : July 17, 2001
INVENTOR(S) : Randy D. Pope

It is certified that error appears in the above-identified patent and that said Letters Patent is hereby corrected as shown below:

Column 6,
Line 43, please replace with the following:
-- claim 3, wherein each said first flange extends from one end of --

Signed and Sealed this

Thirtieth Day of September, 2003

JAMES E. ROGAN
*Director of the United States Patent and Trademark Office*